(12) United States Patent
Xiao et al.

(10) Patent No.: US 10,409,690 B2
(45) Date of Patent: Sep. 10, 2019

(54) STORAGE UTILIZING A DISTRIBUTED CACHE CHAIN AND A CHECKPOINT DRIVE IN RESPONSE TO A DATA DRIVE CORRUPTION

(71) Applicant: EMC IP Holding Company LLC, Hopkinton, MA (US)

(72) Inventors: Huibing Xiao, Beijing (CN); Jian Gao, Beijing (CN); Hongpo Gao, Beijing (CN); Geng Han, Beijing (CN); Jibing Dong, Beijing (CN); Liam Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 15/272,621

(22) Filed: Sep. 22, 2016

(65) Prior Publication Data

US 2017/0091048 A1    Mar. 30, 2017

(30) Foreign Application Priority Data

Sep. 25, 2015  (CN) .......................... 2015 1 0622808

(51) Int. Cl.
 *G06F 11/14* (2006.01)
 *G06F 11/20* (2006.01)
 *G06F 11/10* (2006.01)

(52) U.S. Cl.
 CPC ...... *G06F 11/1451* (2013.01); *G06F 11/1092* (2013.01); *G06F 11/1456* (2013.01);
 (Continued)

(58) Field of Classification Search
 CPC ............. G06F 11/1446; G06F 11/1448; G06F 11/1451; G06F 11/1456; G06F 11/1469; G06F 2201/84
 See application file for complete search history.

(56) References Cited

U.S. PATENT DOCUMENTS 5,748,985 A * 5/1998 Kanai ................. G06F 11/1435
                                                711/130
6,353,878 B1 * 3/2002 Dunham ............. G06F 11/1456
                                                707/999.009
(Continued)

FOREIGN PATENT DOCUMENTS

CN          102521068 A      6/2012

OTHER PUBLICATIONS

Wikipedia's Solid-state Drive historic version published Sep. 23, 2015 https://en.wikipedia.org/w/index.php?title=Solid-state_drive&oldid=682372841 (Year: 2015).*
(Continued)

*Primary Examiner* — Joseph O Schell
(74) *Attorney, Agent, or Firm* — Brian J. Colandreo; Mark H. Whittenberger; Holland & Knight LLP (57) ABSTRACT

A storage method and device for a solid-state drive is provided in embodiments of the present disclosure. The method includes: configuring a checkpoint drive and a cache drive; backing up data blocks from a data drive into the checkpoint drive; and in response to the data drives being corrupted, writing into a further data drive part of the data blocks backed up into the checkpoint drive and part of data blocks in the cache drive. The number of required SSD drives can be significantly reduced with the method and device without losing the data restoration capability. In addition, the degrading performance can also be maintained at a relatively high level.

20 Claims, 6 Drawing Sheets

(52) U.S. Cl.
CPC ...... *G06F 11/1469* (2013.01); *G06F 11/2094*
(2013.01); *G06F 11/1446* (2013.01); *G06F*
*11/1448* (2013.01); *G06F 2201/805* (2013.01);
*G06F 2201/84* (2013.01)

(56) References Cited

U.S. PATENT DOCUMENTS

| | | | | |
|---|---|---|---|---|
| 6,662,307 | B1* | 12/2003 | Sipple | G06F 11/1458 |
| | | | | 714/2 |
| 7,885,921 | B2* | 2/2011 | Mahar | G06F 17/30067 |
| | | | | 707/610 |
| 8,677,086 | B2* | 3/2014 | Sardella | G06F 11/1666 |
| | | | | 711/118 |
| 8,762,636 | B2* | 6/2014 | Sade | G06F 12/0873 |
| | | | | 711/103 |
| 8,862,858 | B1* | 10/2014 | Ozdemir | G06F 11/1435 |
| | | | | 711/206 |
| 2006/0248297 | A1* | 11/2006 | Watanabe | G06F 3/0611 |
| | | | | 711/162 |
| 2011/0208755 | A1* | 8/2011 | Fiske | G06F 11/1448 |
| | | | | 707/751 |
| 2012/0144136 | A1* | 6/2012 | Augenstein | G06F 11/1469 |
| | | | | 711/162 |
| 2014/0101107 | A1* | 4/2014 | Takayama | G06F 3/0604 |
| | | | | 707/649 |
| 2016/0034358 | A1* | 2/2016 | Hayasaka | G06F 3/0619 |
| | | | | 711/113 |
| 2017/0131934 | A1* | 5/2017 | Kaczmarczyk | G06F 3/0608 |

OTHER PUBLICATIONS

First Chinese Office Action issued in CN Application Serial No. 2015106228088 dated Nov. 30, 2018.
Second Chinese Office Action issued in CN Application Serial No. 2015106228088 dated Jun. 10, 2019.

* cited by examiner

STORAGE UTILIZING A DISTRIBUTED CACHE CHAIN AND A CHECKPOINT DRIVE IN RESPONSE TO A DATA DRIVE CORRUPTION

RELATED APPLICATION

This application claim priority from Chinese Patent Application Number CN201510622808.8, filed on Sep. 25, 2015 at the State Intellectual Property Office, China, titled "STORAGE METHOD AND DEVICE FOR SSD DRIVES," the contents of which is herein incorporated by reference in its entirety.

FIELD

Embodiments of the present disclosure generally relate to the storage field, and more particularly to a storage method and device for solid-state drive.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

To solve the above problem, embodiments of the present disclosure provide a storage method and device for solid-state drive. For RAID 1 configuration and for a particular load, the number of the required SSD drives can be significantly reduced with the proposed method and device without losing the data restoration capability. In addition, the degrading performance can also be maintained at a relatively high level.

The method according to embodiments of the present disclosure uses a lower tier HDD or SMR drive with large capacity shared to the group of high performance tier SSD drives for checkpointing data sequentially. At the same time, another high performance SSD drive as a fast cache can be used to ensure the best random performance for degraded operation.

High performance tier drives (SSDs) may have excellent random IOPS capability. Compared with SSD, although HDD (SAS/SAS NL/SMR) cannot compete with SSDs in terms of random IOPS, it can achieve similar level Band width as that of SSD for sequential IO. Moreover, the capacity of HDD is often comparatively large and thus, it can be taken as checkpoint drive to backup (also called "dump") data into SSD sequentially. The latest HDDs may have 4 T and 8 T level capacity and cost far less. With the new SMR technology, a single HDD can provide even more capacity.

The method according to embodiments of the present disclosure makes best combination of advantages of HDD and SSD respectively and can provide the required redundancy for both hot data and cold data as provided by RAID1.

The first aspect of the present disclosure provides a storage method for a solid-state disk, comprising: configuring a checkpoint drive and a cache drive; backing up data blocks from the data drive into the checkpoint drive; and in response to the data drives being corrupted, writing into a further data drive part of the data block backed up into the checkpoint drive and part of data blocks in the cache drive.

According to an embodiment of the present disclosure, the checkpoint drive comprises a hard disk drive, and at least one of the cache drive and the data drive comprises a solid-state disk.

According to an embodiment of the present disclosure, the cache drive is part of the data drive.

According to an embodiment of the present disclosure, the method further comprises: before backing up the data blocks from the data drive into the checkpoint drive: assigning a version number to the data drive for each write operation; and writing the data blocks both into the data drive and the cache drive;

According to an embodiment of the present disclosure, backing up the data blocks from the data drive into the check point drive comprises: sequentially backing up the data blocks from the data drive into the checkpoint drive; and recording the latest version number as a check point number.

According to an embodiment of the present disclosure, sequentially backing up the data blocks from the data drive into the checkpoint drive comprises: after backing up the data blocks from the data drive into the checkpoint drive, identifying data blocks with a version number smaller than the checkpoint number as backed-up data blocks.

According to an embodiment of the present disclosure, in response to the data drives being corrupted, writing into the further data drive part of the data blocks backed up in the checkpoint drive and part of the data blocks in the cache drives comprises: writing data blocks with a version number equal to the check point number from the checkpoint drive into the further data drive; and writing data blocks with a version number larger than the checkpoint number from the cache drive into the further data drive.

The second aspect of the present disclosure provides a storage device for a solid-state disk, comprising: a check point drive; a cache drive; a backup unit configured to back up data blocks from a data drive into the checkpoint drive; and a writing-back unit configured to, in response to the data drive being corrupted, write into a further data drive part of the data blocks backed up into the checkpoint drives and part of the data blocks in the cache drives.

According to an embodiment of the present disclosure, the checkpoint drive comprises a disk drive, and at least one of the cache drive and the data drive comprises a solid-state disk.

According to an embodiment of the present disclosure, the cache drive is part of the data drive.

According to an embodiment of the present disclosure, the device further comprises: a version number assigning unit configured to assign a version number to the data drive for each write operation; and a writing unit configure to write the data blocks both into the data drive and the cache drive.

According to an embodiment of the present disclosure, the backup unit is configured to: sequentially back up the data blocks from the data drive into the checkpoint drive; and record the latest version number as the check point number.

According to an embodiment of the present disclosure, the backup unit is further configured to: after backing up the data blocks from the data drive into the checkpoint drive, identify data blocks with a version number smaller than the check point number as backed-up data blocks.

According to the embodiments of the present disclosure, the writing-back unit is configured to, in response to the data drive being corrupted: write data blocks with a version number equal to the checkpoint number from the check point drive into the further data drive; and write data blocks with a version number larger than the checkpoint number from the cache drive into the further data drive.

The third aspect of the present disclosure provides computer program product for storage of a solid-state drive, the computer program product being tangibly stored on a non-transient computer-readable medium and comprising machine-executable instructions, the machine-executable instructions, when executed, causing a machine to perform steps of the method according to the first aspect of the present disclosure.

BRIEF DESCRIPTION OF THE DRAWINGS

Drawings described herein are provided to further explain the present disclosure and constitute a part of the present application. The example embodiments of the disclosure and the explanation thereof are used to explain the present disclosure, rather than to limit the present disclosure improperly.

DETAILED DESCRIPTION OF EMBODIMENTS

Reference is made to several example embodiments shown in the drawings to describe principles of the present disclosure. Though preferred embodiments of the present disclosure are illustrated in the drawings, it is understood that the embodiments are described only to facilitate those skilled in the art in better understanding and thereby achieving the present disclosure, rather than to limit the scope of the disclosure in any manner.

Figure 1:
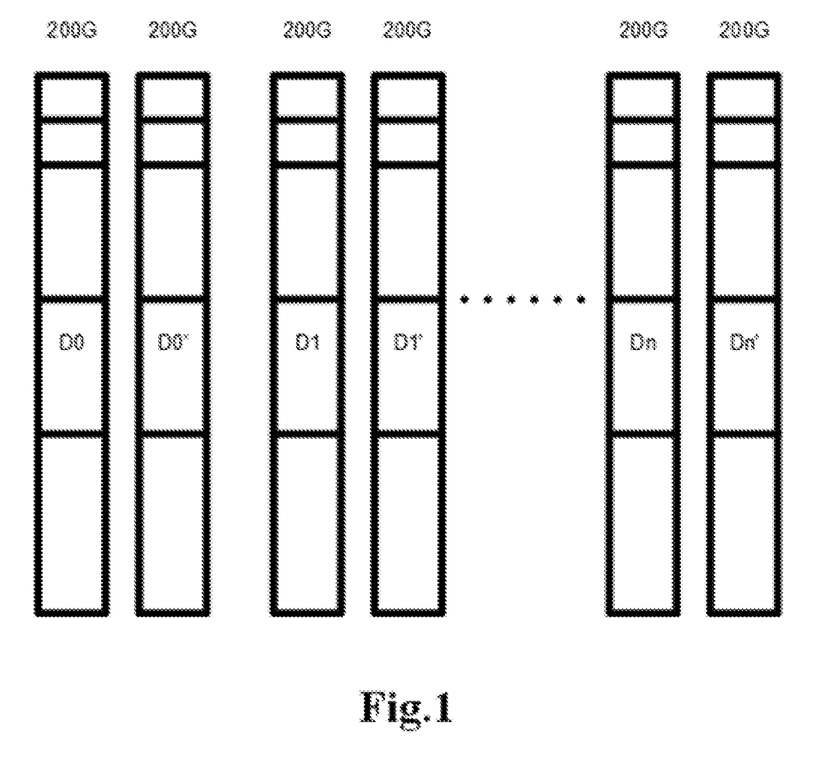
FIG. 1 illustrates a schematic of a traditional RAID 1 configuration comprising "2n" disks for providing capacity of n disks.

RAID 1 is a common configuration for achieving high reliability with two or more drives. Traditionally, this configuration requires two or more equivalent drives at the same tier and with the same capacity in order to achieve two-fold (2×) read performance while can still maintain acceptable performance when degraded. This is often helpful for the hard disk drive (HDD) case from the perspective of performance where read can be shared to two disks. However, for the solid state drive (SSD) case, a single disk may provide enough input/output operations per second (IOPS) needed and other equivalent drives are just installed to provide enough reliability. This means at least two-fold SSDs are usually required to achieve the reliability, thereby increasing the costs. FIG. 1 illustrates a schematic of a traditional RAID 1 configuration with "2n" disks for providing capacity of n disks (wherein "n" is a positive integer).

Moreover, for some applications, the constant performance as well as the constant reliability provided by the traditional RAID 1 configuration is redundant, where the hot data/cold data ratio may be relatively small and hot data is often written by most recent updates and more frequently accessed for read. As is often the case with column based noSQL solutions based on SSDs, columns are stored with many versions and only the most recent version is most likely to be accessed. For this kind of application, the reading and writing of the latest hot data can be cached and shared on a common disk. With a timely regular checkpointing of data sequentially, the original disk data can be safely rebuilt with nearly the same R1 rebuilt time.

Figure 2:
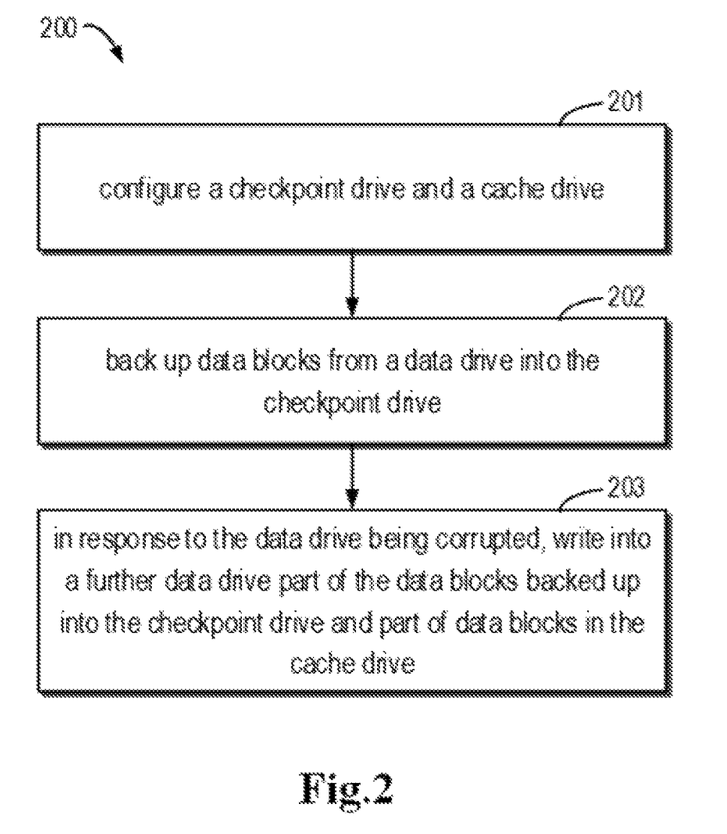
FIG. 2 illustrates a flow diagram of the storage method of a solid-state disk according to an embodiment of the present disclosure.

FIG. 2 illustrates a flow diagram of a storage method 200 for a solid-state disk according to an embodiment of the present disclosure. As shown in FIG. 2, the method 200 includes steps 201-203. At 201, configuring a check point drive and a cache drive. At 202, backing up data blocks from a data drive into the checkpoint drive. At 203, in response to the data drive that is corrupted or degraded, writing into a further data drive part of the data blocks that have been backed up into the checkpoint drive and part of data blocks in the cache drive.

According to an example embodiment of the present disclosure, the check point drive includes a hard disk drive, and at least one of the cache drive and the data drive comprises a solid-state disk.

Figure 3:
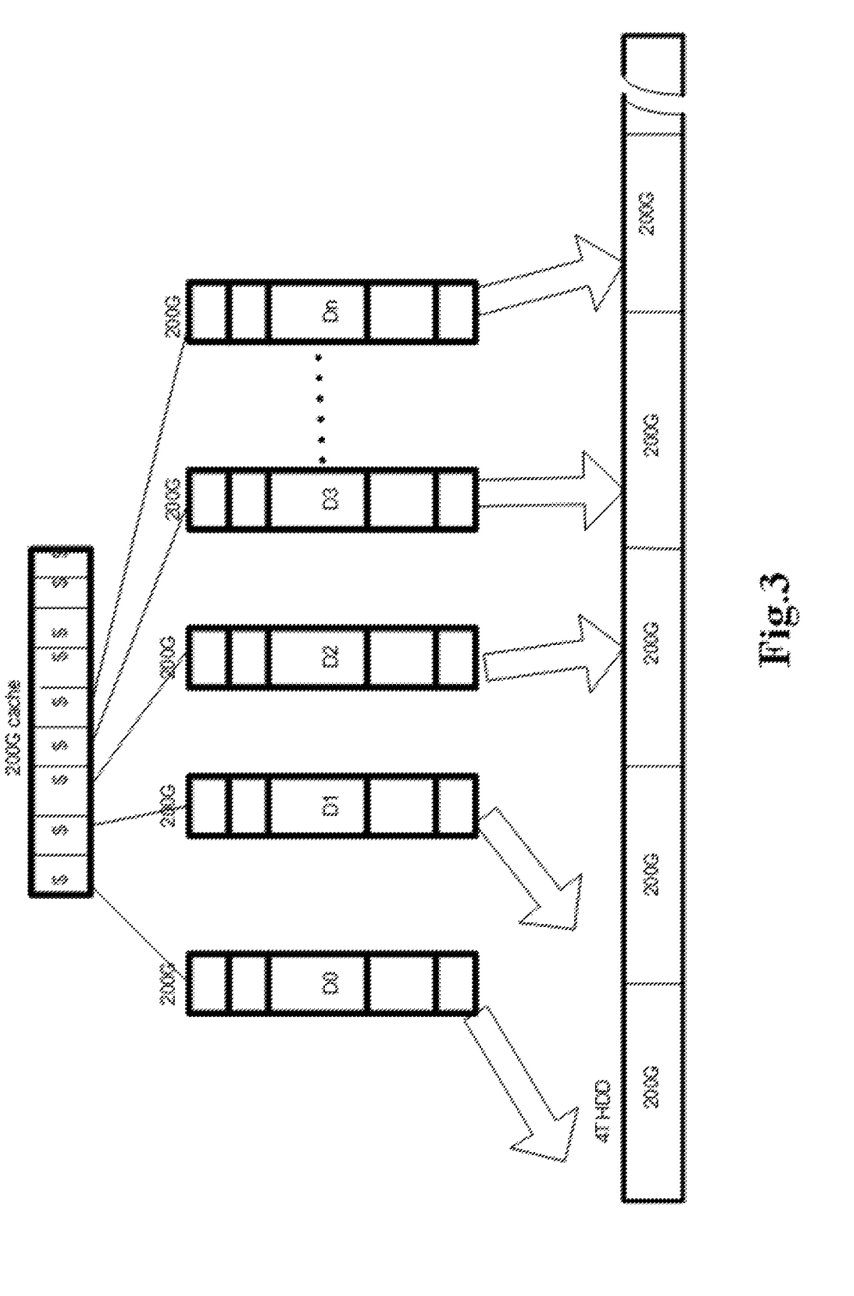
FIG. 3 illustrates a schematic of the storage method for a solid-state disk according to an embodiment of the present disclosure.

As an example, FIG. 3 illustrates a schematic of the storage method for a solid-state disk according to an embodiment of the present disclosure. As shown in FIG. 3, the storage device achieves a capacity of "n" SSD disks by using "n+2" disks. The storage device includes one SSD drive as a cache drive, and one 4T HDD drive as a checkpoint drive. Compared with the storage structure of the traditional RAID 1 configuration as shown in FIG. 1 (namely, achieving a capacity of "n" SSD disks by using "2n" disks), the storage structure as shown in FIG. 3 reduces the number of the required SSD drives significantly.

According to an example embodiment of the present disclosure, the cache drive may be part of the data drive.

Figure 4:
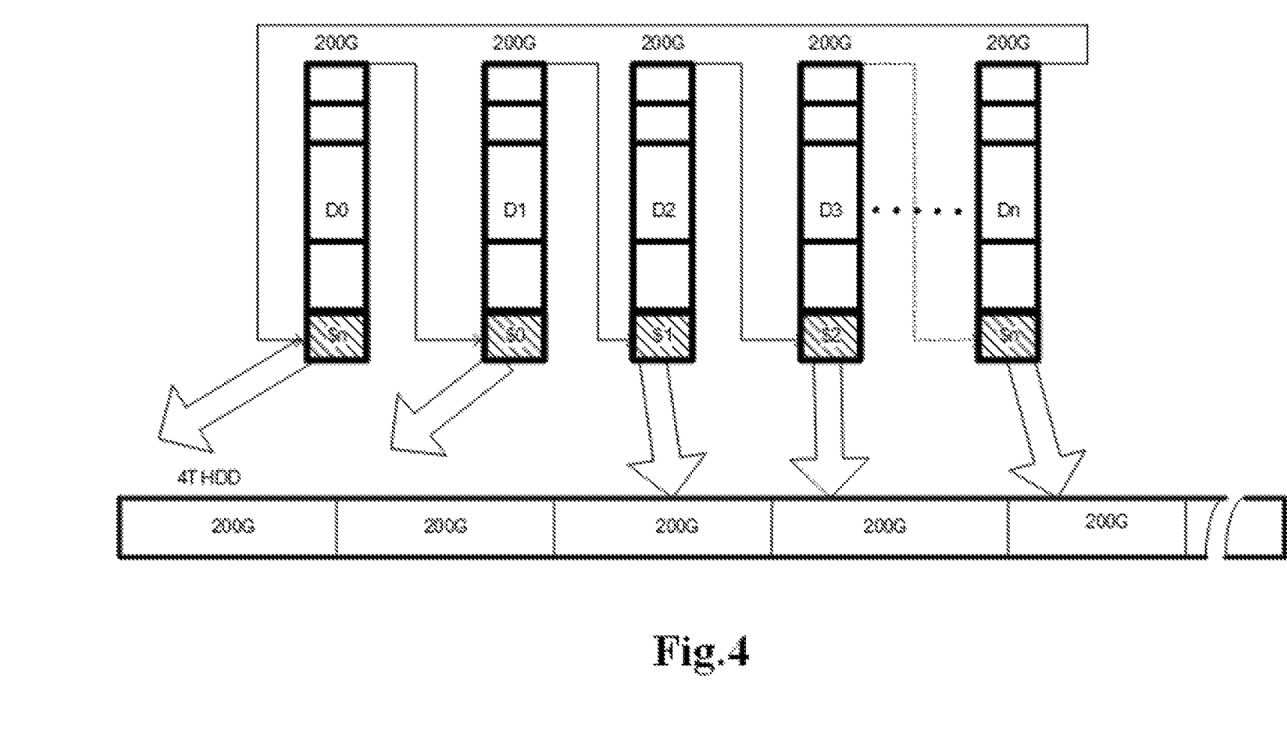
FIG. 4 illustrates a schematic of the storage method for the solid-state disk according to another embodiment of the present disclosure.

As another example, FIG. 4 illustrates a schematic of the storage method for a solid-state disk according to another embodiment of the present disclosure, wherein the cache drive has a form of a distributed cache chain and is distributed in each SSD drive and functions as a cache of another SSD drive. As shown in the embodiment of FIG. 4, D1 is the cache of D0, D2 is the cache of D1, and D0 is the cache of Dn, wherein D1, D2 . . . Dn are serial numbers for individual SSD drives. Such distributed cache structure is intended to prevent the individual cache drive shown in FIG. 3 from turning into a bottleneck.

According to an example embodiment of the present disclosure, the method 200 further comprises:

For each write operation, and before step 202:

(1) assign a version number (V) to the target data drive, wherein the version number is a large positive integer increasing monotonously from 0 for each data drive; and (2) write the data block both into the target data drive and the cache drive.

For each read operation:

only access the data drive, without accessing the cache drive or the check point drive. However, the system keeps track of a heat map within the range of the logic block address (LBA) and duplicates (also called "promotes") the hottest access data into the cache according to the cache size.

The write operation to the cache drive needs to be hashed to a mapping table entry according to its LBA for fast lookup. The metadata mapping entry also needs to include the corresponding version number (V) generated in the above steps for slots reclaim comparison and rebuild recovery. The metadata mapping entry also needs to include a bit to indicate whether the corresponding data has been backed up (also called "dirty"). The mapping table can be stored either on the same cache drive or somewhere in memory or both to speed up lookup.

Figure 5:
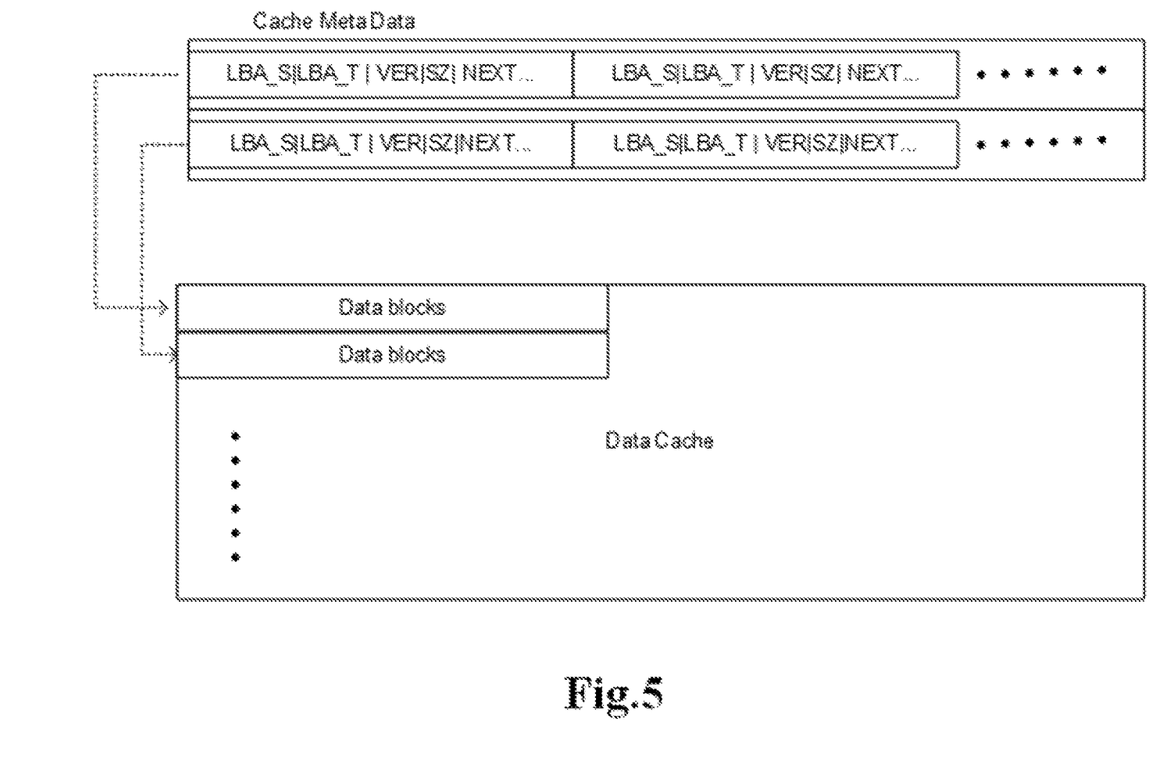
FIG. 5 illustrates an example implementation of data cache according to an embodiment of the present disclosure.

FIG. 5 illustrates an example embodiment of data cache, wherein:

LBA_S represents where the data of the cache is located in the data cache drive;

LBA_T represents the real LBA that the entry represents;

VER represents the version number for the updates, VER is a large positive integer and its highest bit represents whether data has been backed up (whether the data is clean or dirty). If the highest bit of VER is 1, then it means that the data is clean; if the highest bit of VER is 0, then it means that the data is dirty.

According to an example embodiment of the present disclosure, step 202 further comprises: sequentially backing up the data blocks from the data drive into the checkpoint drive; and recording the latest version number that has been backed up as a check point number.

It is noted that the time interval for backup operation can be configured statically according to the requirement of reliability, or configured dynamically according to the consumed cache capacity.

It is also noted that the system is always keeping track of the latest check point of each data drive which indicates that the latest snap files with the latest data updates in the data drives have been backed up into the check point drive.

According to an example embodiment of the present disclosure, sequentially backing up data in the data drive into the check point drive comprises: after backing up the data blocks from the data drive into the check point drive, identifying the data blocks a the version number smaller than the checkpoint number as backed-up data blocks.

For data duplication/promotion to the cache, the process is similar to the write operation. The difference lies in that the bit indicating that data is dirty (or the dirty bit) needs to be set as clean (i.e., indicating that data has been backed up), and the version number is set as 0.

It is noted that for the configuration shown in FIG. 3, the cache may be a unified shared cache pool and does not have fixed size for each SSD data and each access. In this manner, the cache may be utilized with the highest efficiency. Similarly, the backup time interval may be arranged in accordance with the utilization of the cache for each drive. For example, if a certain data drive is seldom written with new data and contains less dirty data, the data drive may require least frequent backup.

According to an example embodiment of the present disclosure, at 203, the system only needs to select other standby HDD drives and perform another backup for all the data drives associated with it when the check point drives are corrupted.

According to an example embodiment of the present disclosure, when the data drives are corrupted, writing into a further data drive part of the data blocks backed up in the check point drives and part of the data block in the cache drives includes: writing data blocks with a version number equal to the check point number from the check point drive into another data drive; and writing data blocks with a version number larger than the check point number from the cache drive into another data drive.

Before the data is restored in the new SSD data drive completely, the new SSD data drive will not accept any read and write (IO) operation from the user. If there is cache available, all read and write operations of the user will go firstly to the cache, and then go further to HDD if necessary.

The system needs to be engineered according to the IO write operation, and a safety margin of cache usage will be maintained by adjusting the cache size appropriately and access to the checkpoint drive will be minimized with a proper checkpoint interval.

Once all the data have been rebuilt in the new spare drive, the system returns to the normal working mode and the cache area of the new spare drive will also begin to accept cache updates and promotions for hot reads.

According to an example embodiment of the present disclosure, in a scenario where more than one data drive (i.e. two or more) is corrupted, data can still be recovered. As shown in FIG. 3, even if all data drives are corrupted, the data can still be accessed and recovered if a dedicated cache drive has been assigned. The recovery procedure is similar to the procedure in the scenario where only one data drive is corrupted.

However, when the checkpoint drive with the configuration as shown in FIG. 3 is corrupted and meanwhile a data drive is also corrupted, data must be recovered from the exterior backup.

For example, if a bandwidth of 1000 MB is assigned, a 200 G SSD rebuild only takes 2000 seconds restoring from the checkpoint HDD drive. If a 2 T HDD is shared to ten SSDs of 200 G, the maximum round of the checkpoint time from the first drive to the last drive would be 2000*10=5.5 hours. Given the cache size of 20 G per each SSD data drive and a total of 300 G overall cache for ten SSD data drives, the permitted maximum user IO write operations is about 300 G/5.5=55 G/hour, which is sufficient for a particular application.

Figure 6:
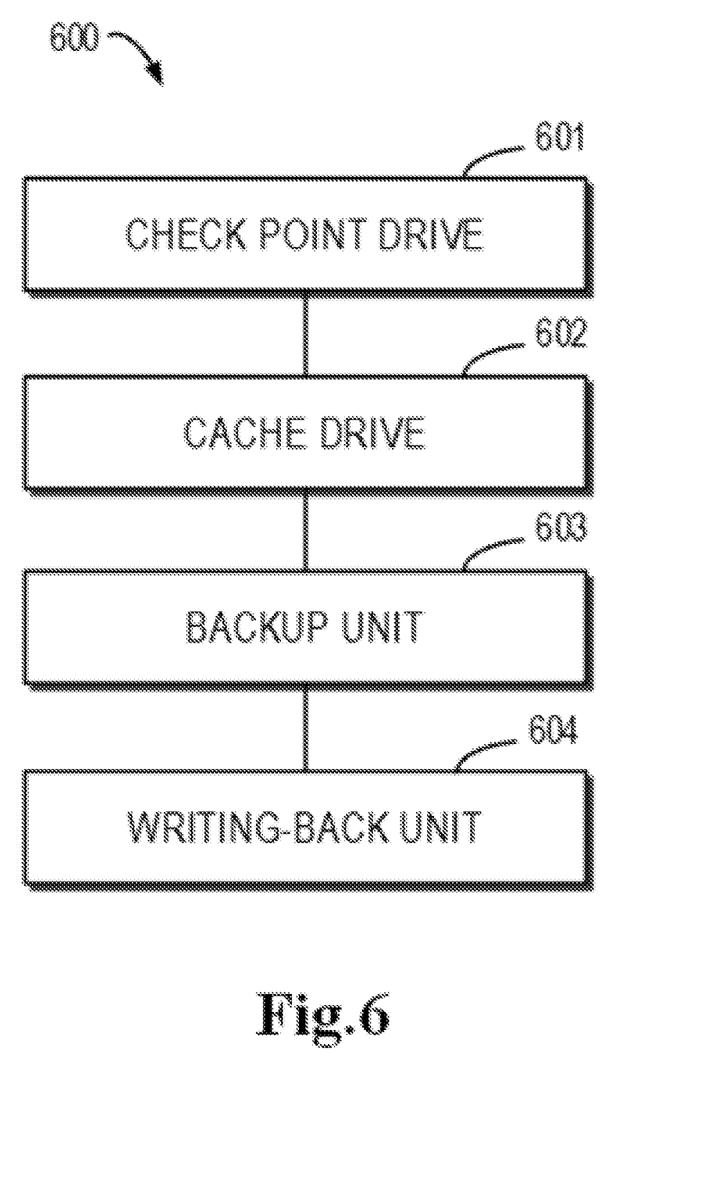
FIG. 6 illustrates a block diagram of the storage device for a solid-state disk according to an embodiment of the present disclosure.

The second aspect of the present disclosure provides a storage device 600 for a solid-state disk, comprising: a check point drive 601; a cache drive 602; a backup unit 603 configured to back up data blocks from the data drive into the checkpoint drive; and a writing-back unit 604 configured to, in response to the data drives being corrupted, write into a further data drive part of the data block that have been backed up into the checkpoint drive and part of data blocks in the cache drive.

According to an example embodiment of the present disclosure, the checkpoint drive 601 comprises a hard disk drive, and at least one of the cache drive 602 and the data drive comprises a solid-state disk.

According to an example embodiment of the present disclosure, the cache drive 602 is part of the data drive, as shown in FIG. 4.

According to an example embodiment of the present disclosure, the device further comprises: a version number assigning unit configured to assign a version number to the data drive for each write operation; and a writing unit configured to write the data block both into the data drive and the cache drive;

According to an example embodiment of the present disclosure, the backup device 603 is configured to sequentially back up data blocks from the data drive into the check point drive; and record the latest version number as the check point number.

According to an example embodiment of the present disclosure, the backup device 603 is configured to, after backing up the data blocks from the data drive into the checkpoint drive, identify data blocks with a version number smaller than the checkpoint number as backed-up data blocks.

According to an example embodiment of the present disclosure, the writing-back unit 604 is configured to, in response to the data drive being corrupted, write data blocks with a version number equal to the checkpoint number from the check point drive into the further data drive; and write data blocks with a version number bigger than the checkpoint number from the cache drive into the further data drive.

To sum up, a storage method and device for a solid-state disk is provided. The method comprises: configuring a checkpoint drive and a cache drive; backing up data blocks from a data drive into the checkpoint drive; and in response to the data drive being corrupted, writing into a further data drive part of the data blocks backed up into the check point drive and part of the data blocks in the cache drives. The number of required SSD drives can be significantly reduced with the method and device without losing the data restoration capability. In addition, the degrading performance can also be maintained at a relatively high level.

The above are only optional embodiments and not limited to the present disclosure. For those skilled in the art, the present disclosure allows various modifications and changes. Any modifications, equivalent alternatives and improvement, etc. within the spirit and principle of the present disclosure shall be included in the scope of protection of the present disclosure.

What is claimed is:

1. A storage method for a solid-state disk, comprising:
configuring a checkpoint drive and a cache drive, wherein the cache drive comprises a plurality of solid-state disks, wherein the cache drive includes a cache chain distributed in each solid-state disk drive of the plurality of solid-state disk drives;
backing up data blocks from a data drive into the checkpoint drive; and
in response to the data drive being corrupted, writing into a further data drive part of the data blocks backed up into the checkpoint drive and part of the data blocks in the cache drive based upon, at least in part, a comparison of version numbers of the data blocks in the cache drive and a comparison of checkpoint numbers of the data blocks in the checkpoint drive.

2. The method of claim 1, wherein the checkpoint drive comprises a hard disk drive, and the data drive comprises a solid-state disk.

3. The method of claim 1, wherein the cache drive is part of the data drive.

4. The method of claim 1, further comprising:
before backing up the data blocks from the data drive into the checkpoint drive:
assigning a version number to the data drive for each write operation into the data drive and the cache drive; and
writing the data blocks into the data drive and the cache drive.

5. The method of claim 4, wherein backing up the data blocks from the data drive into the checkpoint drive comprises:
sequentially backing up the data blocks from the data drive into the checkpoint drive; and
recording a latest version number as a check point number.

6. The method of claim 5, wherein sequentially backing up the data blocks from the data drive into the checkpoint drive comprises: after backing up the data blocks from the data drive into the check point drive, identifying data blocks with a version number smaller than the checkpoint number as backed-up data blocks.

7. The method of claim 5, wherein in response to the data drive being corrupted, writing into the further data drive part of the data blocks backed up in the checkpoint drive and part of the data blocks in the cache drives comprises:
writing data blocks with a version number equal to the checkpoint number from the checkpoint drive into the further data drive; and
writing data blocks with a version number larger than the checkpoint number from the cache drive into the further data drive.

8. A storage device for a solid-state disk, comprising:
a check point drive;
a cache drive, wherein the cache drive comprises a plurality of solid-state disks, wherein the cache drive includes a cache chain distributed in each solid-state disk drive of the plurality of solid-state disk drives;
a backup unit configured to back up data blocks from a data drive into the checkpoint drive; and
a writing-back unit configured to, in response to the data drives being corrupted, write into a further data drive part of the data blocks backed up into the checkpoint drive and part of the data blocks in the cache drive based upon, at least in part, a comparison of version numbers of the data blocks in the cache drive and a comparison of checkpoint numbers of the data blocks in the checkpoint drive.

9. The device of claim 8, wherein the checkpoint drive comprises a hard disk drive, and the data drive comprises a solid-state disk.

10. The device of claim 8, wherein the cache drive is part of the data drive.

11. The device of claim 8, further comprising:
a version number assigning unit configured to assign a version number to the data drive for each write operation into the data drive and the cache drive; and
a writing unit configured to write the data block into the data drive and the cache drive.

12. The device of claim 11, wherein the backup unit is configured to:
sequentially back up the data blocks from the data drive into the checkpoint drive; and
record a latest version number as a check point number.

13. The device of claim 12, wherein the backup unit is configured to: after backing up the data blocks from the data drive into the checkpoint drive, identify data blocks with a version number smaller than the check point number as backed-up data blocks.

14. The device of claim 12, wherein the writing-back unit is configured to, in response to the data drive being corrupted:
   write data blocks with a version number equal to the checkpoint number from the check point drive into the further data drive; and
   write data blocks with a version number larger than the checkpoint number from the cache drive into the further data drive.

15. A computer program product for storage of a solid-state drive, the computer program product comprising:
   a non-transitory computer readable medium encoded with computer-executable code, wherein the code is configured to enable the execution of:
      configuring a checkpoint drive and a cache drive, wherein the cache drive comprises a plurality of solid-state disks, wherein the cache drive includes a cache chain distributed in each solid-state disk drive of the plurality of solid-state disk drives;
      backing up data blocks from a data drive into the checkpoint drive; and
      in response to the data drive being corrupted, writing into a further data drive part of the data blocks backed up into the checkpoint drive and part of the data blocks in the cache drive based upon, at least in part, a comparison of version numbers of the data blocks in the cache drive and a comparison of checkpoint numbers of the data blocks in the checkpoint drive.

16. The computer program product of claim 15, wherein the checkpoint drive comprises a hard disk drive, and the data drive comprises a solid-state disk.

17. The computer program product of claim 15, wherein the cache drive is part of the data drive.

18. The computer program product of claim 15, wherein the code is further configured to enable the execution of: before backing up the data blocks from the data drive into the checkpoint drive:
   assigning a version number to the data drive for each write operation into the data drive and the cache drive; and
   writing the data blocks into the data drive and the cache drive.

19. The computer program product of claim 18, wherein backing up the data blocks from the data drive into the checkpoint drive comprises:
   sequentially backing up the data blocks from the data drive into the checkpoint drive; and
   recording a latest version number as a check point number.

20. The computer program product of claim 19, wherein sequentially backing up the data blocks from the data drive into the checkpoint drive comprises: after backing up the data blocks from the data drive into the check point drive, identifying data blocks with a version number smaller than the checkpoint number as backed-up data blocks.

* * * * *